(12) United States Patent
Kazui et al.

(10) Patent No.: US 7,078,688 B2
(45) Date of Patent: Jul. 18, 2006

(54) SHAPE MEASURING DEVICE AND SHAPE MEASURING METHOD

(75) Inventors: Masato Kazui, Hitachi (JP); Mitsuji Ikeda, Hitachinaka (JP); Atsushi Takane, Mito (JP)

(73) Assignee: Hitachi High-Technologies Corporation, Tokyo (JP)

( * ) Notice: Subject to any disclaimer, the term of this patent is extended or adjusted under 35 U.S.C. 154(b) by 85 days.

(21) Appl. No.: 10/927,536

(22) Filed: Aug. 27, 2004

(65) Prior Publication Data

US 2005/0061973 A1 Mar. 24, 2005

(30) Foreign Application Priority Data

Aug. 27, 2003 (JP) ........................... 2003-302265

(51) Int. Cl.
*H01J 37/28* (2006.01)
*G01N 23/203* (2006.01)

(52) U.S. Cl. ............... 250/306; 250/307; 250/310; 250/492.2; 250/492.3

(58) Field of Classification Search ............... 250/306, 250/307, 310, 492.2, 492.3
See application file for complete search history.

(56) References Cited

U.S. PATENT DOCUMENTS 4,912,313 A 3/1990 Kato et al.
6,756,590 B1 * 6/2004 Kazui et al. ............... 250/310

FOREIGN PATENT DOCUMENTS

| JP | 5-181980 | 7/1993 |
|---|---|---|
| JP | 2625787 | 4/1997 |
| JP | 2650281 | 5/1997 |
| JP | 2716997 | 11/1997 |

OTHER PUBLICATIONS

Allgair, John, et al. "Implementation of Spectroscopic Critical Dimension (SCD™) for Gate CD Control and Stepper Characterization" Proceedings of SPIE, vol. 4344, 2001, pp. 462–471.

* cited by examiner

*Primary Examiner*—Nikita Wells
(74) *Attorney, Agent, or Firm*—McDermott Will & Emery LLP

(57) ABSTRACT

This invention is to provide a shape measuring device and a shape measuring method that can accurately measure a cross-sectional shape or a three-dimensional shape of a sample without using matching of characteristics. A shape measuring apparatus comprises a charged particle beam apparatus comprising a processor for measuring detected charged particles signal generated from the sample. The charged particle beam is irradiated to sample at first angle to generate a first signal and second angle to generate second signal. The processor selects a parameter indicating a relation between the first signal and a height of the sample or an inclination angle of the specimen until the first signal which achieves the second signal.

6 Claims, 14 Drawing Sheets

SIGNAL WAVEFORM

CROSS SECTION OF
A TARGET WAFER

ESTIMATED CROSS-SECTIONAL SHAPE OF A TARGET WAFER WHEN AN ARBITRARY PARAMETER IS USED

MEASUREMENTS OF A CROSS-SECTIONAL SHAPE OF A TARGET WAFER

TAPERED

RETROGRADE

PROFILES (THE UPPER GRAPH), AND
HISTOGRAMS (THE LOWER GRAPH), OF
THE INTENSITY OF A SECONDARY ELECTRON
AT CHANGED IRRADIATION ANGLES OF
AN ELECTRON BEAM

HISTOGRAM INTERSECTION OF (A)

HISTOGRAM INTERSECTION OF (B)

FOOTING IS SMALL, AND ROUNDING IS LARGE

FOOTING IS LARGE, AND ROUNDING IS SMALL

UNDERSHOOTING IS LARGE

UNDERSHOOTING IS SMALL

QUADRATIC DIFFERENTIAL PROFILE

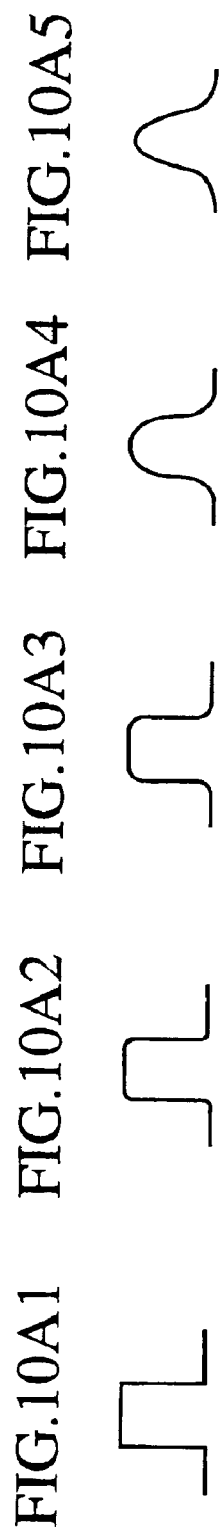
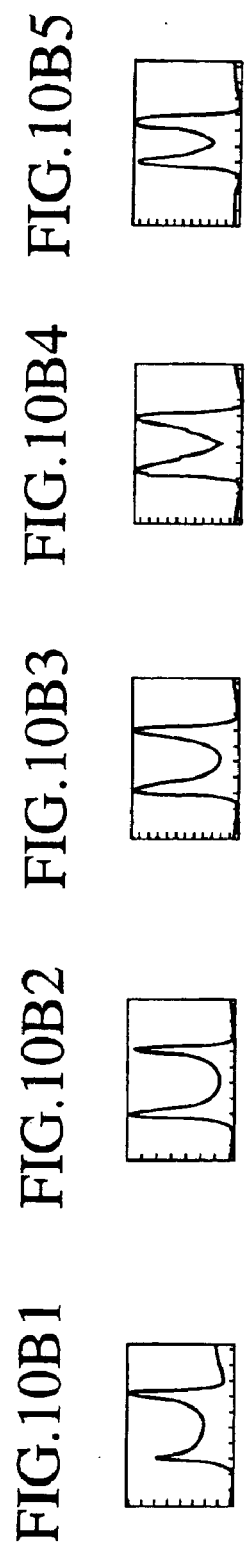
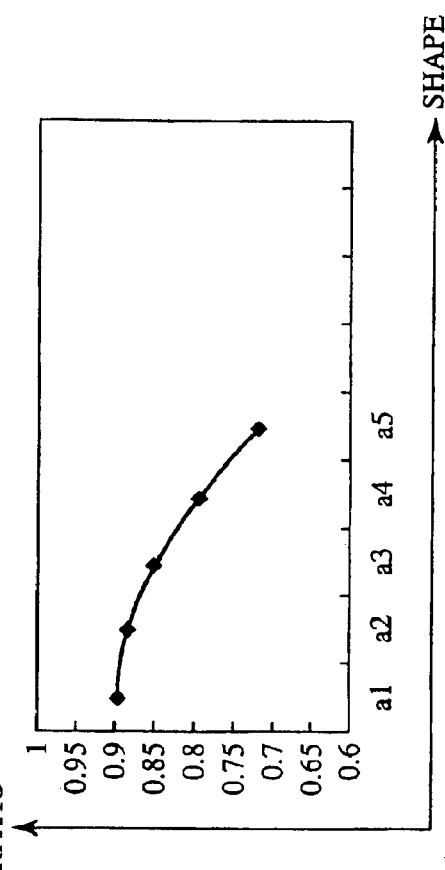
FIG.10A1 FIG.10A2 FIG.10A3 FIG.10A4 FIG.10A5
FIG.10B1 FIG.10B2 FIG.10B3 FIG.10B4 FIG.10B5
FIG.10C

STRAIGHT SIDE

HOLLOWED SIDE

PROFILE OF A SECONDARY ELECTRON INTENSITY

QUADRATIC DIFFERENTIAL PROFILE OF (C)

FIG.12A
CROSS-SECTIONAL SHAPE
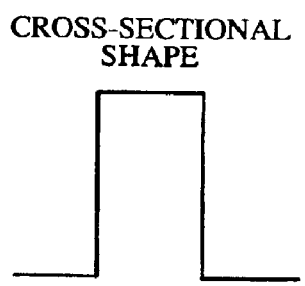
FIG.12B
PROFILE OF THE SECONDARY ELECTRON INTENSITY
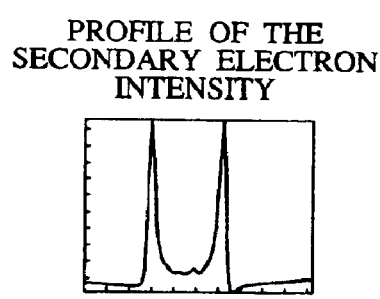
FIG.12C
PROFILE OF THE SECONDARY ELECTRON INTENSITY, HAVING A PLURALITY OF DIFFERENT SHAPES
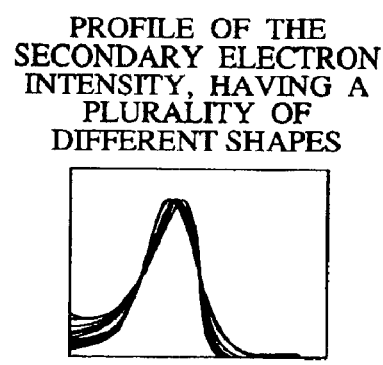
FIG.12D
ANALYSIS OF MAIN COMPONENTS OF (C)
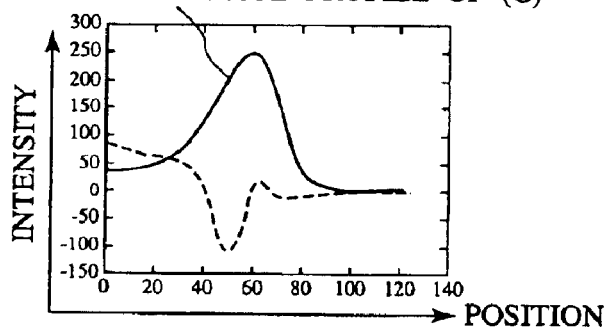
FIRST MAIN COMPONENT
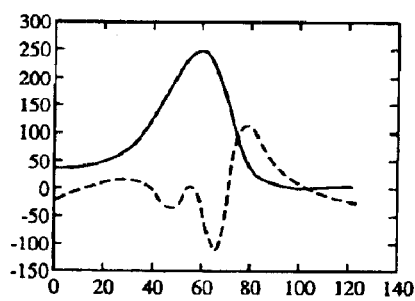
SECOND MAIN COMPONENT
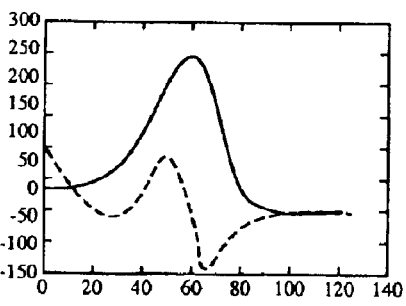
THIRD MAIN COMPONENT
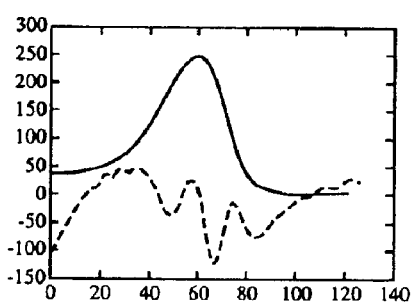
FOURTH MAIN COMPONENT

CROSS-SECTIONAL SHAPE OF THE SIDE

INTENSITY OF A SECONDARY ELECTRON

LINEAR DIFFERENTIAL PROFILE

QUADRATIC DIFFERENTIAL PROFILE

SCHEMATIC DIAGRAM OF
A HOLLOWED SHAPE

MEASUREMENTS OF THREE-DIMENSIONAL
SHAPES BEFORE AND AFTER CORRECTING THE SHAPES

SHAPE MEASURING DEVICE AND SHAPE MEASURING METHOD

TECHNICAL FIELD

The present subject matter relates to a shape measuring device and a shape measuring method, which irradiate a sample with an electromagnetic wave or a charged particle and then measure a shape of the sample by use of a signal generated from the sample.

BACKGROUND

When a wiring pattern is formed on a semiconductor wafer, there is adopted the method including the steps of applying on the semiconductor wafer a coating material which is called resist; applying masking of a wiring pattern on the resist, and then irradiating the resist with visible rays or ultraviolet rays; and exposing the resist to the visible rays, the ultraviolet rays, or an electron beam to form the wiring pattern. The wiring pattern obtained by this method is subject to changes in a tilt angle and a shape of a slope part of the wiring pattern depending on the intensity and diaphragm of the visible rays, the ultraviolet rays, or the electron beam, with which the wiring pattern is irradiated. Therefore, in order to form a wiring pattern with a high degree of accuracy, it is necessary to measure a three-dimensional shape of the wiring pattern and thereby to inspect the wiring pattern. For the purpose of this inspection, if a wafer is cut to measure its cross-sectional shape, it is possible to accurately measure the cross-sectional shape. However, it requires both labor and cost. For this reason, there has been proposed the technique for measuring a cross-sectional shape of a pattern nondestructively and in a noncontact manner by use of an image of an electron microscope. For example, there is the technique for measuring a cross-sectional shape by use of the "shape from shading" method and the stereo matching method in combination. More specifically, characteristics of a signal waveform detected by a secondary electron detector of an electron microscope are detected, and then an absolute value of the height of a cross section is measured by stereo matching of the characteristics, and thereby a shape between the characteristics is determined by the "shape from shading" method. A technique for restoring an accurate three-dimensional shape is disclosed in, for example, Japanese Patent Application Laid-Open No. Hei 5-181980, which is capable of coping with a sudden change in surface of a target to be measured. In this literature, an edge is detected from two-dimensional brightness image data, and then a parameter representing the smoothness of a surface of an object is calculated from the edge to restore a three-dimensional shape of the object by use of this parameter.

However, as for the technique that uses the conventional stereo matching method, characteristics are displaced in their matching if a SN ratio of an input signal is low, resulting in a great error in measurement of a three-dimensional shape. In addition, the technique that uses the spectra CD requires measurement data to build a database. In this case, a pattern which can be measured is limited to an iteration structure (lattice pattern) of lines. Moreover, its output is not three-dimensional image display but numeric data (the width and the height of wiring, and a tilt angle), which is not sufficient to display a three-dimensional shape.

SUMMARY

An object of the present invention is to provide a shape measuring device and a shape measuring method that can accurately measure a cross-sectional shape or a three-dimensional shape of a sample without using matching of characteristics. A shape measuring apparatus comprises a charged particle beam apparatus comprising: a charged particle gun for emitting a charged particle beam, a scanning deflector for deflecting the charged particle beam on a sample, a detector for detecting charged particles emitted from an area scanned by the charged particle beam on the sample, and a processor for measuring detected charged particles signal.

The charged particle beam is irradiated to sample at first angle to generate a first signal and second angle to generate second signal. The processor varies a parameter indicating a relation between the first signal and a height of the sample or an inclination angle of the specimen until the first signal which achieves the second signal.

According to above subject matter, it enables to find a signal indicating a height of the specimen or the inclination angle of the sample without matching two images.

The further detailed composition and effects of the present subject matters are made obvious in the following description of exemplary embodiments.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIGS. 10A1 through 10A5, 10B1 through 10B5, and 10C are diagrams illustrating shape index values of a top rounding shape and of a corner rounding shape;

FIGS. 12A through 12D are diagrams illustrating a shape index value obtained from a profile of the secondary electron intensity by means of the principal component analysis;

DETAILED DESCRIPTION

Figure 1:
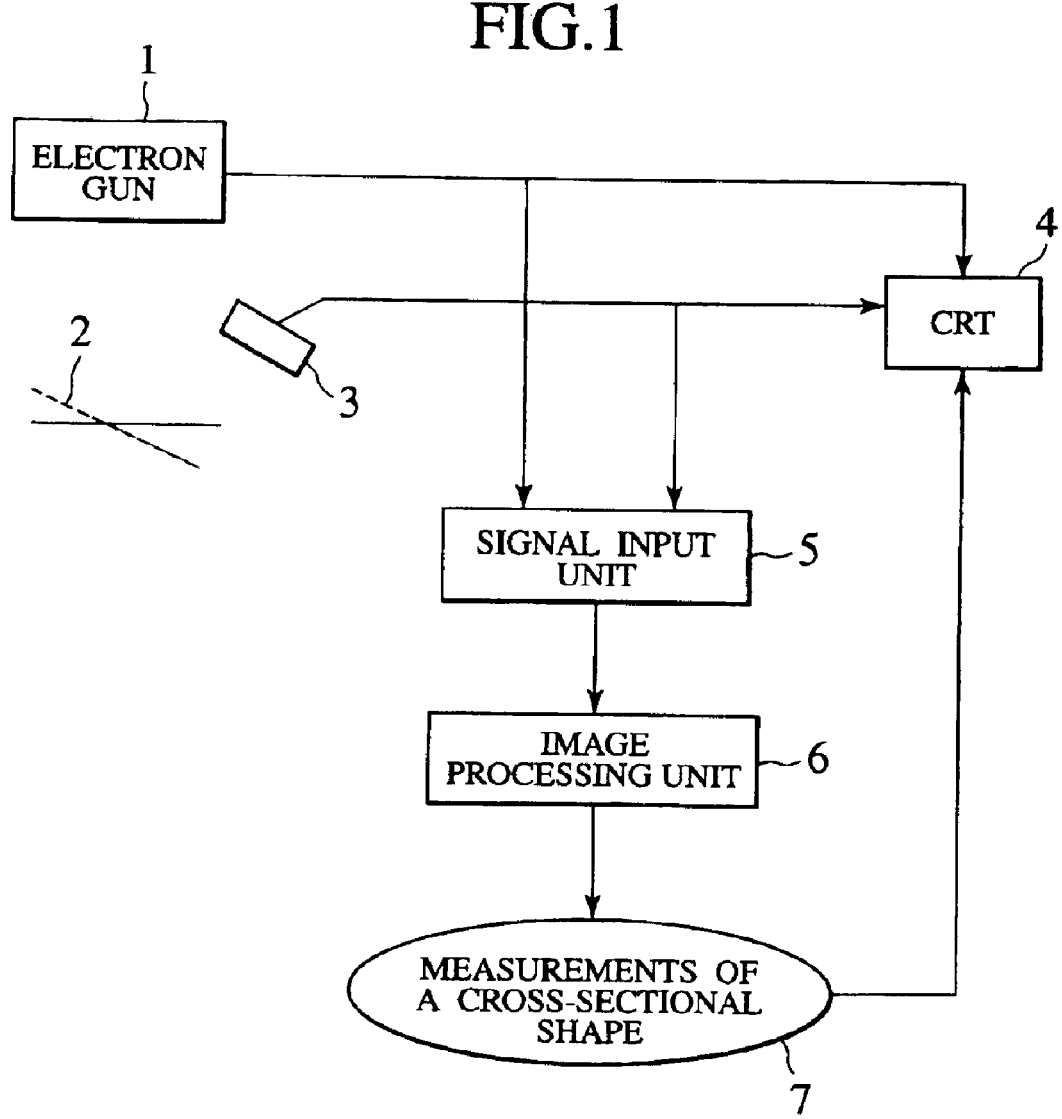
FIG. 1 is a schematic diagram illustrating a three-dimensional shape measuring device, which is one embodiment according to the present invention.

In the following detailed description, numerous specific details are set forth by way of examples in order to provide a thorough understanding of relevant teaching. However, it should be apparent to those skilled in the art that the present teaching may be practiced without such details. In other instance, well known methods, procedures, components, and circuitry have been described at a relatively high-level, without detail, in order to avoid unnecessarily obscuring aspects of the present concepts.

A following embodiments explain the following points:

(1) when a cross-sectional shape candidate is estimated, calculating a tilt angle of a surface of a sample at a position where the sample is irradiated with an electromagnetic wave or a charged particle by use of a detection output of the signal intensity as well as a plurality of parameters selected from among two or more kinds of parameters relating to a cross-sectional shape of the sample;

(2) when a cross-sectional shape of the sample is estimated, selecting a parameter used to close the difference between the signal intensities obtained by irradiating a beam from two angles to a specimen, to a difference of detected charged particle intensities depending on the two angles difference;

(3) when a cross-sectional shape of the sample is estimated, selecting a parameter until the difference between the estimated signal intensity and detection results of the signal intensity shows a difference of detected charged particle intensities depending on the two angles difference;

(4) storing as a database the estimated cross-sectional shape candidate, the estimated cross-sectional shape, and the plurality of parameters;

(5) when an incident angle of an electromagnetic wave or of a charged particle relative to the sample is changed, changing a mounting angle of the sample with a direction in which the sample is irradiated with an electromagnetic wave or a charged particle fixed, or changing a direction in which the sample is irradiated with an electromagnetic wave or a charged particle with the mounting angle of the sample fixed;

(6) when a cross-sectional shape of the sample is estimated, selecting at least one parameter from among two or more kinds of parameters, and then inputting the selected parameter from outside by use of advance information;

(7) when a cross-sectional shape of the sample is estimated, detecting a shape index value that is used to judge the cross-sectional shape of the sample from a detection output of the signal intensity;

(8) detecting a shape index value when an incident angle is changed;

(9) when a cross-sectional shape of the sample is estimated, correcting the measurements of the cross-sectional shape of the sample by use of the shape index value, and thereby measuring a further detailed cross-sectional shape;

(10) creating a lookup table in which a cross-sectional shape obtained by sectioning the sample is associated with the signal intensity or the shape index value; and

(11) inputting the signal intensity or the shape index value into the lookup table, and outputting the classified cross-sectional shapes.

A tilt angle of a surface of a sample is calculated from the signal intensity obtained by irradiating the sample with an electromagnetic wave or a charged particle. From this calculated value, for example, a plurality of cross-sectional shape candidates of the sample are estimated. On the assumption that the cross-sectional shape candidates of the sample obtained by the estimation are irradiated with an electromagnetic wave or a charged particle at an angle that is different from an incident angle at the time of actually irradiating the sample with an electromagnetic wave or a charged particle, the signal intensity obtained from the cross-sectional shape candidates of the sample is estimated. The estimated signal intensity is compared with the actual signal intensity obtained from the sample when the incident angle relative to the sample is changed to the assumed angle. Judging from the result of the comparison, for example, a cross-sectional shape of the sample, the comparison result of which shows a minimum value, is selected as the most likely cross-sectional shape of the sample. Accordingly, a cross-sectional shape of the sample can be determined as an absolute value of the height (the length in the Z-axis direction) of the sample without performing matching of characteristics. Moreover, it is possible to determine a three-dimensional shape of the sample by storing a cross-sectional shape of the sample obtained when the sample is irradiated with an electromagnetic wave or a charged particle along an axis (Y axis) in the depth direction.

Embodiments will be described with reference to drawings.

FIG. 1 is a block diagram illustrating the entire configuration of a three-dimensional shape measuring apparatus as one embodiment. The three-dimensional shape measuring device comprises an electron gun 1, a sample stage 2, an electron detector 3, an indicator 4 that is a CRT, a signal input unit 5, and an image processor 6. A wafer 7 is mounted on the sample stage 2. The image processor 6 measures charged particles signal emitted from the sample based on an output of the electron detector 3. The image processor 6 is programmed to calculate the following operation explained in this specification. The image processor 6 has a computer or other processor which controls the shape measuring apparatus built-in. The computer performs a sequence of operations according to executable code embodied in a readable medium when the program installed in the arithmetic unit. Aspects of the methods outlined above may be embodied in software, e.g. in the form of program code executable by the computer or other programmable device. Such software typically is carried on or otherwise embodied in a medium or media. Terms such as "readable medium" used herein refer to any medium that participates in providing instruction and/or data to a programmable processor, such as a CPU for execution or other processing.

The sample stage 2 is configured to be capable of being tilted. In this embodiment, the sample stage 2 is so devised that its tilt angle $\phi$ can be selected from either $\phi=0$ or $\phi=\phi o$. To be more specific, the mounting angle of the wafer 7 that is mounted on the sample stage 2 can be selected from either a tilt angle $\phi=0$ or $\phi=\phi o$, which is the tilt angle of the sample stage 2.

The electron gun 1 irradiates the wafer 7 mounted on the sample stage 2 with an electron beam 8 as a charged particle. The electron gun 1 irradiates the wafer 7 with an electron beam while relatively moving along an axis (x axis) in a scanning direction. At the same time, the electron gun 1 irradiates the wafer 7 with an electron beam while relatively moving along an axis (Y axis) in a depth direction that is perpendicular to the axis in the scanning direction. When the wafer 7 is irradiated with an electron beam, this electron beam is entered into the wafer 7 as a primary electron. A part of entered primary electron is created as a secondary electron from the wafer 7. The electron detector 3 detects this secondary electron. To be more specific, it is so devised that when the electron gun 1 as an irradiation means irradiates the wafer 7 with an electron beam, a secondary electron is generated from the wafer 7. The electron detector 3 detects the signal intensity of the secondary electron. The electron detector 3 is configured as a signal-intensity detecting means that detects the signal intensity of the secondary electron generated from the wafer 7. A detection output of the electron detector 3 is inputted into the indicator 4 and the signal input unit 5. The signal input unit 5 includes, for example, an A/D converter. A signal relating to the signal intensity detected by the electron detector 3 is output to the image processor 6 as a digital signal. The result of processing of the image processor 6 is displayed on a screen of the indicator 4 as the measurements of a cross-sectional shape.

On the basis of the detection output of the electron detector 3, the image processor 6 calculates a tilt angle of the surface of the wafer at an incident position of an electron beam. The tilt angle of the wafer's surface is an angle which an incident beam forms with a reflected beam. The image processor 6 comprises a cross-sectional shape candidate estimation means, a signal-intensity estimation means, and a cross-sectional shape estimation means as its functions. The cross-sectional shape candidate estimation means estimates a cross-sectional shape candidate of the wafer 7 from a calculated value. The signal-intensity estimation means estimates the signal intensity of an electron beam generated from a cross-sectional shape candidate of the wafer 7 on the assumption that the cross-sectional shape candidate of the wafer 7 is irradiated with the electron beam with an initial incident angle of the electron beam being changed to a tilt angle $\phi=\phi o$. When the incident angle of the electron beam relative to the wafer 7 is changed, more specifically, when the tilt angle is converted from $\phi=0$ into $\phi=\phi o$, the cross-sectional shape estimation means estimates a cross-sectional shape of the wafer by comparing the estimation result of the signal-intensity estimation means with the signal intensity that has been actually detected by the electron detector 3. The cross-sectional shape is a cross-sectional shape in a height direction (Z-axis direction). In addition, the initial incident angle of the electron beam is an incident angle when the tilt angle $\phi=0$. Moreover, this cross-sectional shape estimation means has a function by which the estimation result which has been obtained when the electron gun 1 irradiates the wafer 7 while relatively moving along the axis in the scanning direction is successively stored every time the electron gun 1 relatively moves along the axis (Y axis) in the depth direction, and thereby a three-dimensional shape of the wafer 7 is estimated on the basis of the stored result.

Figure 2:
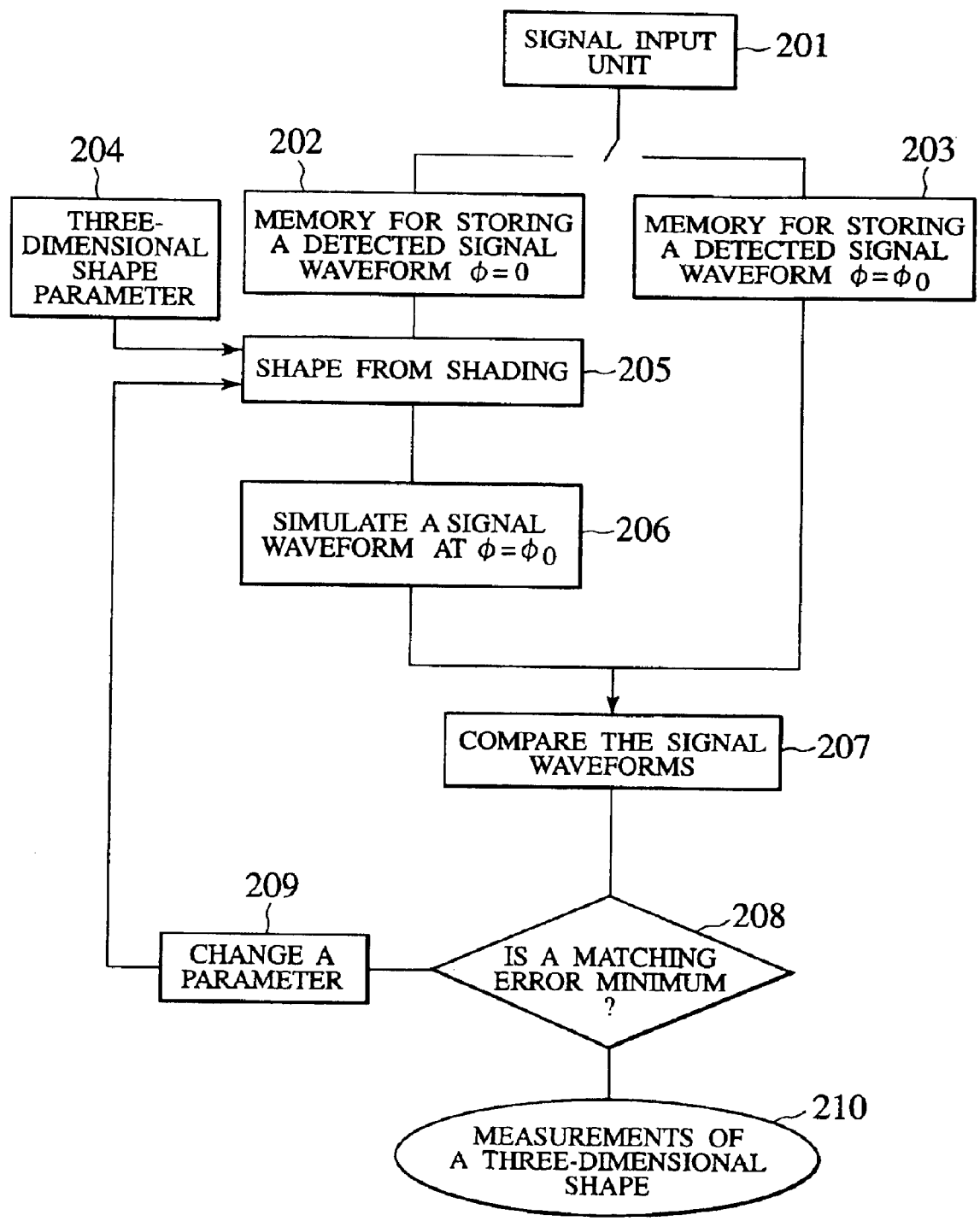
FIG. 2 is a schematic diagram illustrating processing of an image processor, which is one embodiment according to the present invention.

The image processor 6 will be described with reference to FIG. 2. The image processor 6 successively captures a signal detected by the electron detector 3 in the process in which the electron gun 1 irradiates the wafer 7 with an electron beam (step 201). Then, the image processor 6 stores in a memory the signal intensity when the tilt angle of the sample stage 2 has a value of $\phi=0$ (step 202), and also stores in the memory the signal intensity when the tilt angle of the sample stage 2 is changed to $\phi=\phi o$ (step 203).

On the basis of the signal intensity obtained when the tilt angle $\phi=0$, a cross-sectional shape of the wafer 7 is calculated according to the "shape from shading" method (step 205). For example, a parameter n which depends on the quality of material of the wafer 7, and a parameter k relating to the height of a cross section of the wafer 7, are inputted (step 204) as three-dimensional shape parameters. Then, the signal intensity Is of a secondary electron is calculated according to an equation (1) as shown below.

Figure 3:
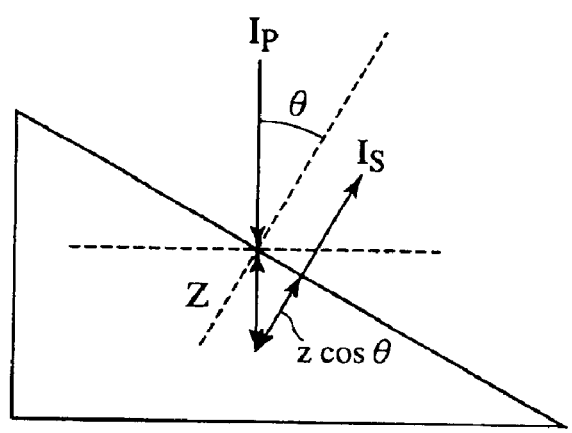
FIG. 3 is a schematic diagram illustrating tilt-angle dependency of the intensity of a secondary electron.

In this embodiment, the "shape from shading" method uses the nature in which a secondary electron reflected from the wafer 7 depends on the tilt angle $\theta$ of a cross section of the wafer. To be more specific, as shown in FIG. 3, when the surface of the wafer 7 is irradiated with an electron beam as a primary electron, a secondary electron is generated from the wafer 7. After that, the secondary electron reaches the surface of the wafer while the secondary electron is exponentially decreasing inside the wafer 7. Then, the secondary electron is emitted to the outside. Accordingly, for example, as described in "Scanning electron microscope" (The Japanese Society of Microscopy, Kanto Branch Kyoritsu Shuppan Co., Ltd.), the amount of emission of a secondary electron increases as the shortest escape distance $z\cos\theta$ decreases. This relationship is expressed by the equation (1). Incidentally, Ip is the signal intensity of a primary electron incident on the wafer 7; Ip is the signal intensity of a secondary electron that has been excited at a depth z inside the wafer, and that has reached the surface of the wafer; and $\theta$ is an angle which an incident electron beam forms with a reflected electron beam.

Equation 1

$$I_S(x) = kI_o \sec^n \theta(x) \qquad (1)$$

In the equation (1), Io is the signal intensity of a secondary electron on a flat part of the wafer 7; and x is the distance from a starting point (the center of rotation) on a certain coordinate axis (x axis that is an axis in a scanning direction). Judging from the equation (1), it is found out that Is (x) increases with increase in tilt angle $\theta$.

Figure 4A:
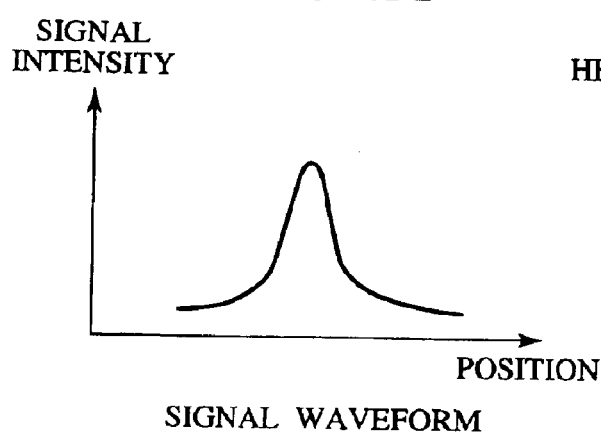
FIGS. 4A, 4B are diagrams illustrating the intensity of a secondary electron, and a cross-sectional shape of a sample in relation to a scan position respectively.

In the process in which the electron gun 1 successively scans the wafer 7 with an electron beam, when the electron detector 3 detects the signal intensity of a secondary electron, a signal waveform as shown in FIG. 4A is obtained as the signal intensity at a position in the scanning direction. Then, the tilt angle $\theta(x)$ of the cross section of the wafer at a position x in the scanning direction is expressed by an equation (2) that is derived from the equation (1).

Equation 2

$$\theta(x) = \cos^{-1}\left(\frac{kI_0}{I_S(x)}\right)^{\frac{1}{n}} \qquad (2)$$

Here, on the assumption that the height of the cross section of the wafer monotonously increases, a cross-sectional shape profile h(x) of the wafer is expressed by an equation (3).

Equation 3

$$h(x) = \int_0^x \tan\theta(\xi)d\xi \qquad (3)$$

Figure 4B:
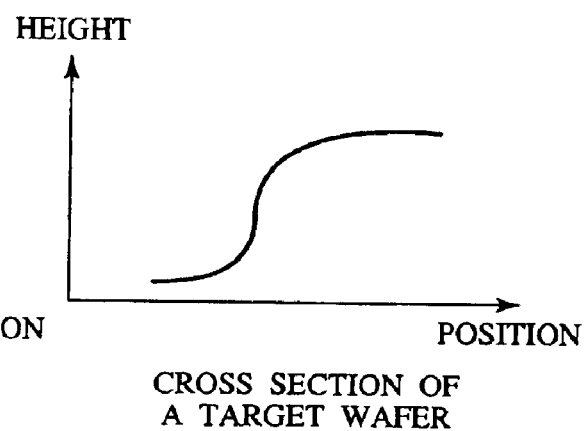

To be more specific, if the equation (2) is substituted into the equation (3), the cross-sectional shape h(x) is determined. In this case, if the tilt angle $\theta$ is large, h(x) is large. Here, if a signal waveform as shown in FIG. 4A is obtained, a cross sectional shape of the wafer along the height direction (the height in the Z-axis direction) for the position x is determined as the cross sectional shape of the wafer as shown in FIG. 4B. Changing values of the parameters n, k, makes it possible to determine a plurality of cross-sectional shape candidates of the wafer 7.

Figure 5:
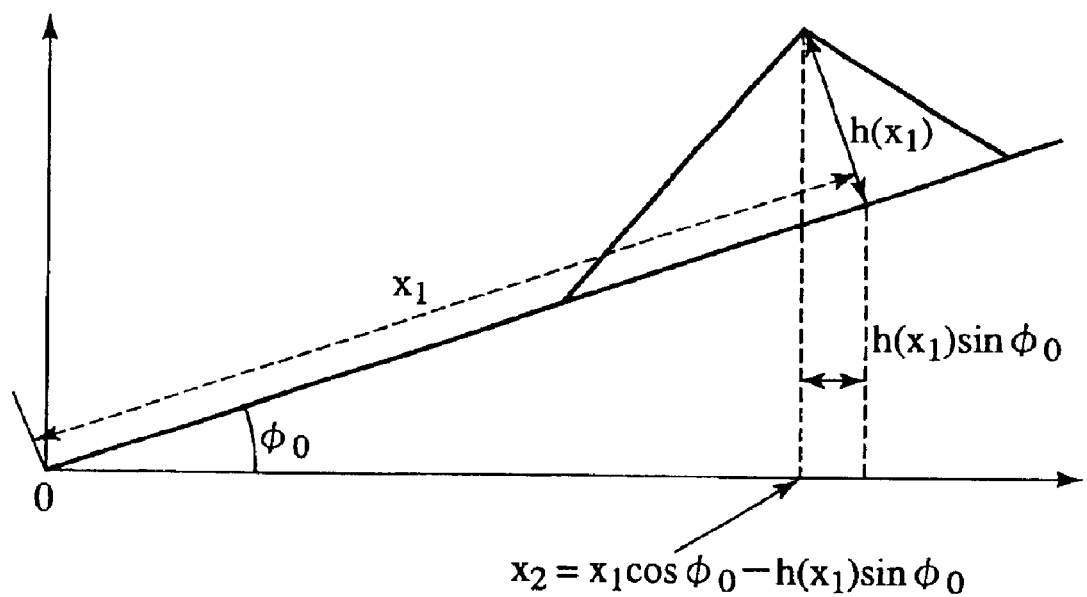
FIG. 5 is a diagram illustrating the principles of stereoscopic vision caused by a tilt of a sample stage.

Next, on the assumption that the cross-sectional shape candidate of the wafer estimated on the basis of the equation (3) is irradiated with an electron beam after the tilt angle is changed from $\phi=0$ to $\phi=\phi o$ as shown in FIG. 5, simulation for estimating the signal intensity of an electron beam generated from the cross-sectional shape candidate of the wafer is performed (step 206). A point on the wafer 7, which can be seen at a position x1 before the wafer 7 is tilted, can be seen at a position x2 after the wafer 7 is tilted. For example, if the cross-sectional shape profile h(x) is expressed in a triangle, a position of a vertex of the triangle can be seen at the position x1 before the wafer 7 is tilted. However, after the wafer 7 is tilted by the tilt angle $\phi=\phi o$, the position of the vertex of the triangle can be seen at the position x2. On the assumptions that the signal intensity obtained at the tilt angle $\phi=0$ is Is1(x), and that the signal intensity detected after the wafer 7 is actually tilted is Is2(x) where the tilt angle is $\phi=\phi o$, it is expressed as Is1(x1)+δI (x1)=Is2(x2). Incidentally, each of x1, x2 is the distance from the center of rotation 0 of the sample stage 2; and δI(x1) is an increase or a decrease in Is1(x) caused by the influence of the equation (1) when the cross-sectional shape obtained by the equation (3) is tilted by the tilt angle $\phi=\phi o$. δI(x1) is expressed by an equation (4) that is derived from the equation (1).

Equation 4

$$\delta I(x_1)=kI(sec^n(\theta(x_1)+\phi_0)-sec^n \theta(x_1)) \quad (4)$$

In addition, x2 is expressed by an equation (5) with reference to FIG. 5.

Equation 5

$$x_2=x_1 \cos \phi_0 - h(x_1)\sin \phi_0 \quad (5)$$

Accordingly, judging from the equation (5) and Is1(x1)+ δI(x1)=Is2(x2), an equation (6) holds true.

Equation 6

$$I_{S1}(x_1)+\delta I(x_1)=I_{S2}(x_1 \cos \phi_0 - h(x_1)\sin \phi_0) \quad (6)$$

The equation (6) is associated with calculation of Is2(x) after tilting the wafer 7 by use of Is1(x). To be more specific, as far as the equation (6) is concerned, if an estimated cross-sectional shape candidate of the wafer is correct, the brightness before tilting the sample stage 2 is the same as that after tilting the sample stage 2.

Next, in comparison with the left side of the equation (6), a judgment is made as to whether or not the difference between both becomes minimum (steps 207, 208).

In this case, by use of an equation (7), a comparison is made in a scanning range from 0 to 1 that is the length in the scanning direction.

Equation 7

$$E = \int_0^l \{I_{S1}(x) + \delta I(x) - I_{S2}(x \cos\phi_0 - h(x)\sin\phi_0)\}^2 dx \quad (7)$$

Here, an error occurring when the sample stage 2 is tilted may cause a displacement of the origin of coordinates of Is1(x), Is2(x) between before and after the tilting. In such a case, a parameter Δx, which is used to correct the displacement, is newly added as a parameter of a three-dimensional shape.

In addition, when a comparison is made according to the equation (7), a value E at each scan position is successively plotted according to the equation (7) to make a judgment as to whether or not the value E is minimum. If the value E is not minimum, values of the parameters n, k are changed, and then processing from the step 205 to the step 208 is repeated. The same processing is further repeated until the value E becomes minimum; and when a minimum value is obtained for one scan line, an absolute value of the height is determined as a cross-sectional shape of the wafer in the scan line. It is to be noted that the cross-sectional shape of the wafer is a two-dimensional shape, and that the absolute value of the height is also the length in the Z-axis direction. Moreover, after measurement of the cross-sectional shape of the wafer for one scan line, the value E is successively stored for a plurality of scan lines every time a scan line is changed along the Y-axis direction. On the basis of the stored result of the value E for each scan line (cross-sectional shape of the wafer 7), a three-dimensional shape of the wafer 7 is estimated, and then the result of the estimation is output (step 210).

Figure 6A:
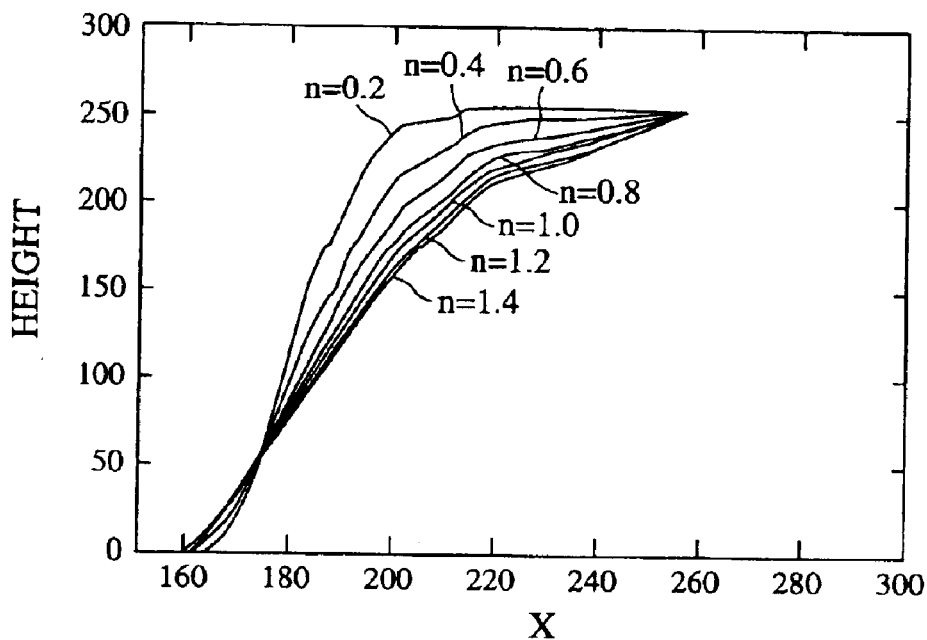
FIGS. 6A and 6B are diagrams illustrating a cross-sectional shape and the measurements of a cross-sectional shape respectively.
Figure 6B:
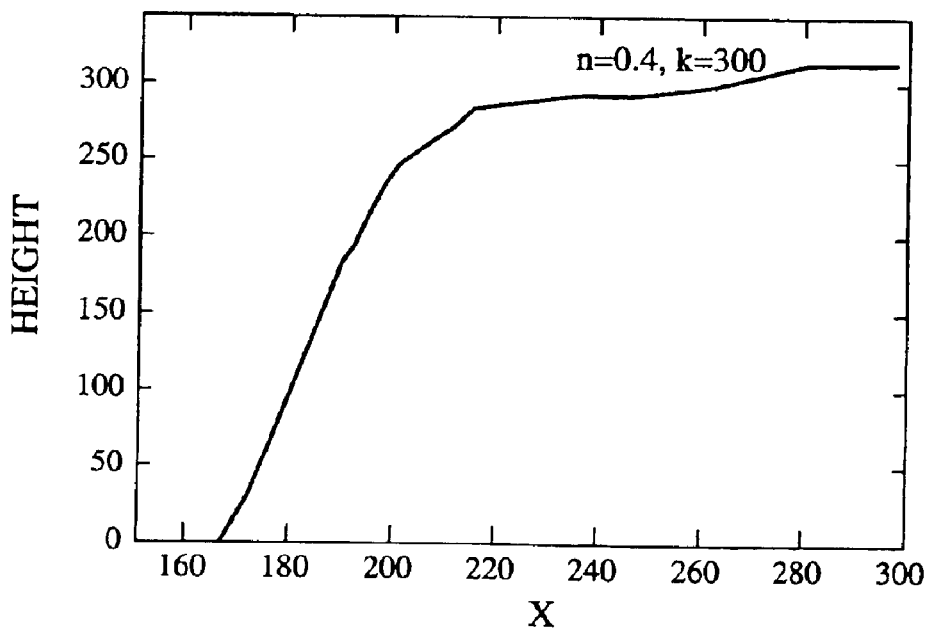

Here, FIG. 6A illustrates an example of a plurality of cross-sectional shape candidates obtained when only the parameter n is changed. In actuality, there are also cross-sectional shape candidates obtained by changing values of k and Δx. For this reason, the processing from the step 205 to the step 209 is repeated to estimate the optimum parameter from among these cross-sectional shape candidates, and then a cross-sectional shape is obtained by successively changing the values of the parameters. FIG. 6B illustrates the obtained cross-sectional shape.

In addition, a database is built by the processing from the step 205 to the step 209. The database includes cross-sectional shape candidates corresponding to values of the parameters n, k, Δx, a comparison error of a signal waveform, and an actual cross-sectional shape if it can be obtained. Analyzing this database makes it possible to examine the validity of the parameters that are set in the equation (2), the equation (3), and the step 204, defining the "shape from shading" in the step 205. In addition, if the validity of the equations and of the parameters can be judged, referring to the built database makes it possible to directly determine a cross-sectional shape for an input signal in the step 203 without performing the calculation of the "shape from shading". In this case, two images (first image and second image) from two angles (e.g. 5 degrees and 10 degrees against a normal line of a surface of the sample) are formed, and a first signal (line profile is formed by the beam of 5 degrees) and a second signal (line profile is formed by the beam of 10 degrees) are formed. And then, a plurality of first signals are formed by varying the parameters (e.g. n, k, and/or Δx) of the first signals. The parameters indicates a relationship between the first signal and a height of the sample or an inclination angle of the sample.

A plurality of estimated second signals (line profiles) of 10 degrees are formed by the first signal and a formula which changes coordinate of the first signals are inclined from 5 degrees to 10 degrees.

By comparing the estimated second signals and real second charged particle signals, the estimated second signal indicating high correlation value between the estimated signals and the real signal indicating is selected. The estimated second signal based on the first signal achieves the real second signal. A signal for measuring the height of sample or the inclination angle is formed based on a parameter of the selected estimated signal.

In this case, an angle of an electron beam incident on the wafer 7 is changed by changing the tilt of the sample stage 2. However, it is also possible to change a glancing angle of an electron beam by use of the deflection of the electron beam, or by inserting a wafer, a tilt angle of which is known, between the wafers 7. In this case, a mechanism for changing the tilt of the sample stage 2 is dispensable. A deflector is used for changing an irradiation angle of the electron beam.

In this case, when the parameters are set in the step 204, the parameters may be set as unknown parameters. However, it is also possible to set the allowable range of a value of each parameter by manual input of known values or by use of information obtained from another measuring device. For example, if the height of a cross section and its reliability are obtained by the AFM (atomic force microscope), the OCD (optical length measuring method, spectra CD), the stereo matching method, the photometric stereo method, the library matching method, the film pressure measurement, or the like, the range of the height to be measured can be predetermined. To be more specific, in the step 204, after the parameter k of the equation (1) is converted into a height parameter h, a value of input height is divided into three: "Unknown", "Approximate", and "Exact". Then, the allowable range of h is defined as, for example, "Unknown: 20% of the input value", "Approximate: 10% of the input value", and "Exact: 0% of the input value". An actually measured value of AFM corresponds to "Exact", and a designed value of a device corresponds to "Approximate". Here, if an actually measured value is used, the allowable range may also be automatically set according to a specific equation judging from 3σ of the measured value of at an n point. In addition, if the quality of material of an object to be measured is known, a value of the parameter n can be predetermined. In addition, if an extended equation of the equation (1) is used, a known value can be set to an extended parameter. For example, the acceleration voltage of an electron beam, or the like, corresponds to the extended parameter. As a result, a three-dimensional rebuilt shape with higher reliability is obtained.

Thus, according to this case, using simulation of an input signal waveform makes it possible to determine an absolute value of the height of a cross-sectional shape relating to the wafer 7 without requiring matching of characteristics of a stereo image. In addition, in contrast to the spectra CD, a cross-sectional shape of an arbitrary pattern can also be measured.

Moreover, in the above-mentioned case, the wafer 7 is irradiated with an electron beam as a charged particle. However, a proton or an ion beam can also be used as the charged particle; and instead of the charged particle, an electromagnetic wave such as visible rays and ultraviolet rays can also be used. If an electromagnetic wave is used, the wafer 7 is irradiated with the electromagnetic wave, and then the signal intensity of the electromagnetic wave reflected by the wafer 7 is detected.

Figure 7:
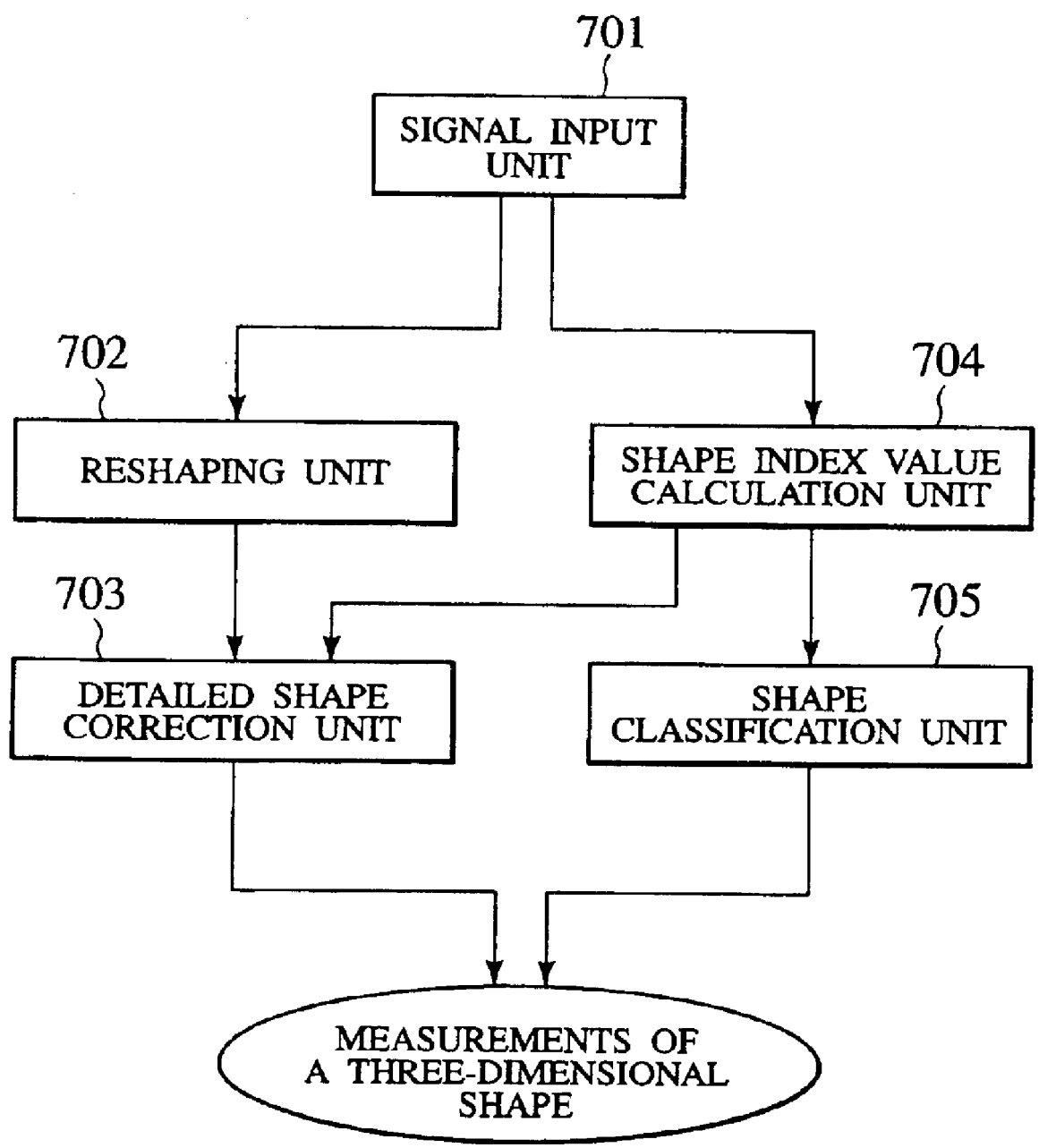
FIG. 7 is a schematic diagram illustrating a three-dimensional shape measuring method.

Another case will be described with reference to drawings as below. FIG. 7 is a block diagram illustrating the entire configuration of a three-dimensional shape measuring function including a three-dimensional shape classification function and a three-dimensional shape correction function. In FIG. 7, the three-dimensional shape measuring function comprises a signal input unit 701, a reshaping unit 702, a detailed shape correction unit 703, a shape index value calculation unit 704, and a shape classification unit 705.

The signal input unit 701 is connected to the signal input unit 5. The signal intensity of a secondary electron is inputted into the signal input unit 701. The reshaping unit 702 is the image processor 6, which measures a three-dimensional shape in the block diagram shown in FIG. 2. Incidentally, a reshaping unit other than that described in this embodiment may also be used as the reshaping unit 702. The shape index value calculation unit 704 calculates from the signal intensity a shape index value representing a kind and an extent of a cross-sectional shape. The detailed shape correction unit 703 corrects a three-dimensional shape output from the reshaping unit 702 by use of the calculated shape index value, and then outputs a further detailed three-dimensional shape. The shape classification unit 705 outputs a cross-sectional shape corresponding to a shape index value by use of a lookup table in which a shape index value is associated with a cross-sectional image of a wafer. Each unit will be specifically described as below.

The shape index value calculation unit 704 performs differential processing of the signal intensity of a secondary electron inputted from the signal input unit 701, or performs principal component analysis, and thereby, without measuring a cross-sectional shape, for example, the difference between top rounding and corner rounding, the size of footing, the difference between taper and retrograde, and a "hollow" of the side, are classified to calculate a shape index value representing an extent of the shape. Specific steps will be described as below.

Figure 8A:
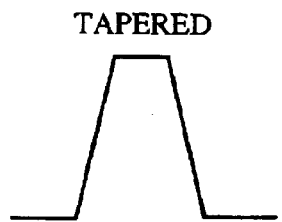
FIGS. 8A through 8E are diagrams illustrating shape index values of a taper shape and of a retrograde shape.
Figure 8B:
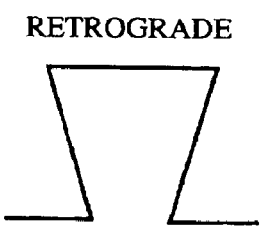
Figure 8C:
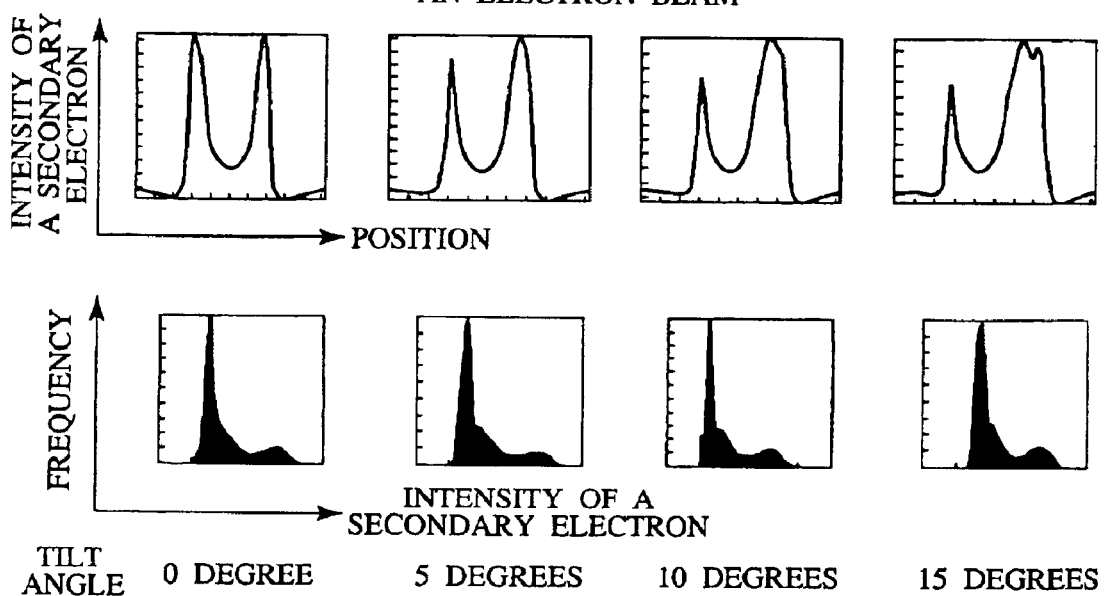
Figure 8D:
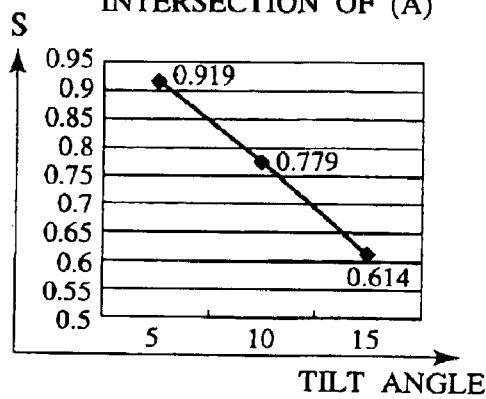
Figure 8E:
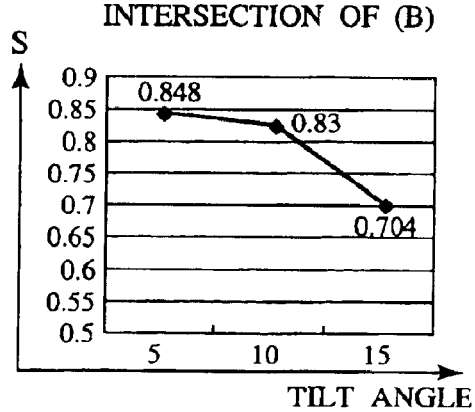

A classification method for classifying a taper shape and a retrograde shape will be described with reference to FIGS. 8A through 8C. FIG. 8A is a schematic diagram illustrating a taper shape. FIG. 8B is a schematic diagram illustrating a retrograde shape. The upper graph of FIG. 8C illustrates profiles of the intensity of a secondary electron for a certain line pattern. The horizontal axis indicates a scan position of an electron beam, and the vertical axis indicates the intensity of a secondary electron. The lower graph of FIG. 8C illustrates histograms of the intensity of a secondary electron. The horizontal axis indicates the intensity of a secondary electron, and the vertical axis indicates the frequency of a secondary electron. FIG. 8C illustrates, from left to right, profiles and histograms of the intensity of a secondary electron at the time when an irradiation angle of an electron beam, which is a tilt angle of the emission from the electron gun 1 in FIG. 1, is changed to 0 degree, 5 degrees, 10 degrees, and 15 degrees. As shown in FIG. 8C, a visible part of the side having a cross-sectional shape becomes larger with increase in tilt angle. Accordingly, if a bright part of the side increases on the basis of the tilt-angle dependency of the secondary electron intensity as shown in FIG. 3, the distribution of the histogram changes. Here, because ways of the change differ between a shape in FIG. 8A and a shape in FIG. 8B, detecting this difference makes it possible to distinguish the shape in FIG. 8A from that in FIG. 8B. To be more specific, if histogram intersection (for example, see M. J. Swain and D. H. Ballard, "Color Indexing" Int. J. Comput. Vision, Vol. 7, no. 1, pp. 11–32, 1991) are used, the results as shown in FIGS. 8D and 8E are obtained for the shapes in FIGS. 8A and 8B. The histogram intersection can be obtained by an equation (8).

Equation 8

$$S = \sum_{i=0}^{N} \min(A_i, B_i) \qquad (8)$$

In the equation (8), each of A, B is a normalized histogram in which the total frequency is normalized to 1.0. N is the number of bins of a histogram. FIGS. 8D and 8E illustrate the result of determining S in histograms in which tilt angles are 0 degree, 5 degrees, 10 degrees, and 15 degrees. As shown in FIGS. 8D and 8E, in case of a taper shape, S linearly changes; and in case of a retrograde shape, S nonlinearly changes. By use of this difference, it is possible to classify the difference between the taper shape and the retrograde shape. Further, evaluating the linearity and the tilt (for example, evaluating how a line of the graph is curved) makes it possible to determine a shape index value representing an extent of taper or an extent of retrograde.

Figure 9A:
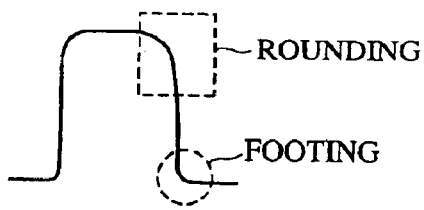
FIGS. 9A through 9E are diagrams illustrating shape index values of a footing shape and of a rounding shape.
Figure 9B:
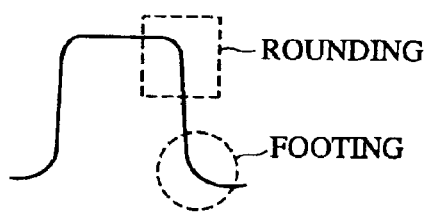
Figure 9C:
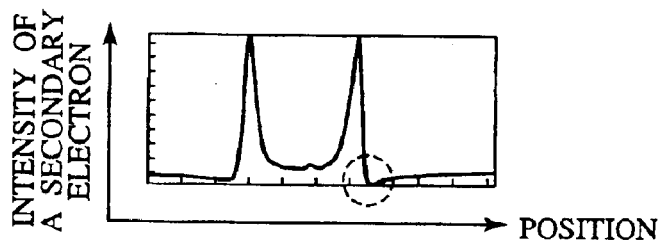
Figure 9D:
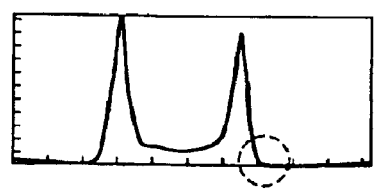
Figure 9E:
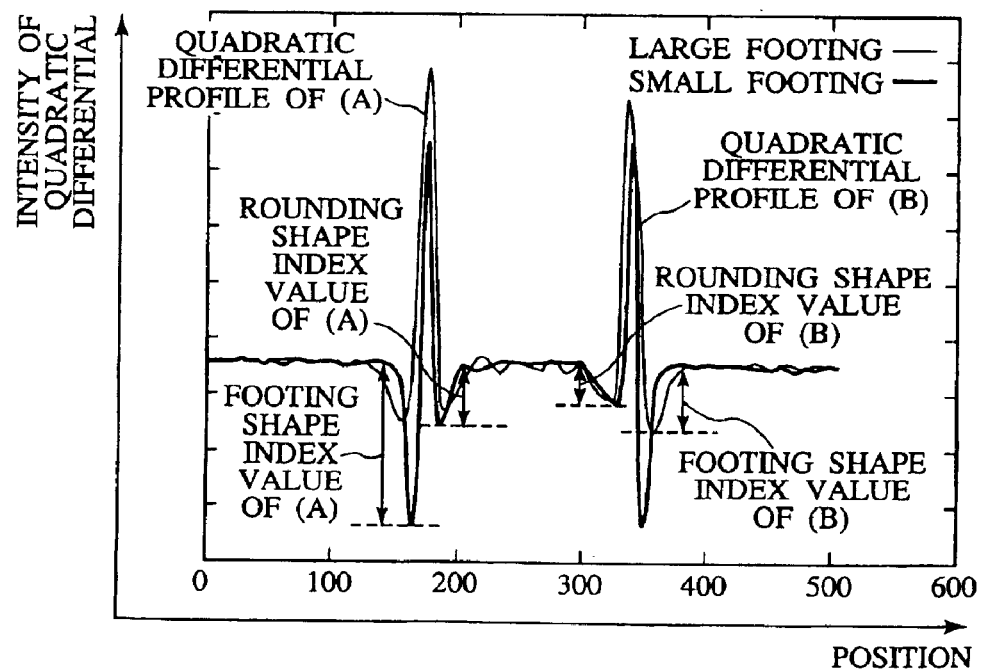

A classification method for classifying the size of footing will be described with reference to FIGS. 9A through 9D. FIGS. 9A and 9B illustrate a cross-sectional shape, footing (a shape in a dotted circle) of which is small, and a cross-sectional shape, footing of which is large respectively. FIGS. 9C and 9D illustrate a profile of the intensity of a secondary electron corresponding to FIG. 9A and a profile of the intensity of a secondary electron corresponding to FIG. 9B respectively. If the footing is small, undershooting occurs in a footing part of the profile of the secondary electron intensity. Here, if quadratic differential of the profiles in FIGS. 9C and 9D is performed, a waveform shown in FIG. 9E is obtained. When the quadratic differential profile is observed, peaks for the footing part in the downward direction differ between the shape in FIG. 9A and the shape in FIG. 9B. This difference enables the classification of the footing size, and consequently the peak size can be used as a shape index value. In addition, for a rounding shape (a shape in a dotted rectangle) in FIGS. 9A and 9B, an index value which is similar to the index value of the footing shape can be determined, as shown in FIG. 9E. The footing shape index value and the rounding shape index value become larger as a shape becomes more square-cornered. The footing shape index value and the rounding shape index value become smaller as a shape becomes rounder.

A classification method for classifying top rounding and corner rounding will be described with reference to FIG. 10. FIG. 10A1 through 10A5 illustrate cross-sectional shapes, each of which has a round shape that is different from the other. FIG. 10B1 through 10B5 illustrate profiles of the secondary electron intensity corresponding to FIG. 10A1 through 10A5. Here, with reference to FIG. 10B1 through 10B5, if for example the maximum value of a discrimination ratio that divides into two a double peak shape of a profile of the secondary electron intensity is calculated (for example, see "Computer Image Processing, Hideyuki TAMURA", p. 140, Ohm-Sha Ltd., 2002), the results in FIG. 10C are obtained. FIG. 10C illustrates how the discrimination ratio changes corresponding to the difference in shape. More specifically, in case of a shape like corner rounding as shown in FIG. 10A1, the maximum value of the discrimination ratio is large, whereas in case of a shape like top rounding as shown in FIG. 10A5, the maximum value of the discrimination ratio is small. Accordingly, the maximum value of the discrimination ratio can be used as a shape index value of rounding.

Figure 11A:
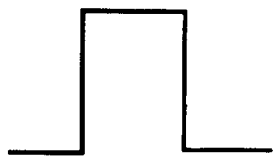
FIGS. 11A through 11D are diagrams illustrating a shape index value of a hollowed-side shape.
Figure 11B:
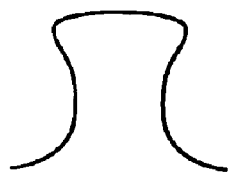
Figure 11C:
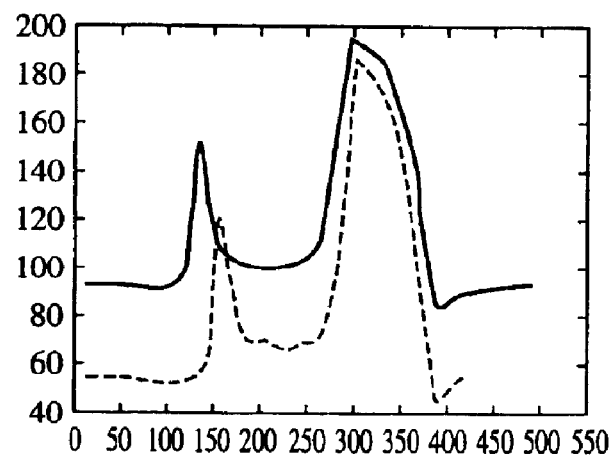
Figure 11D:
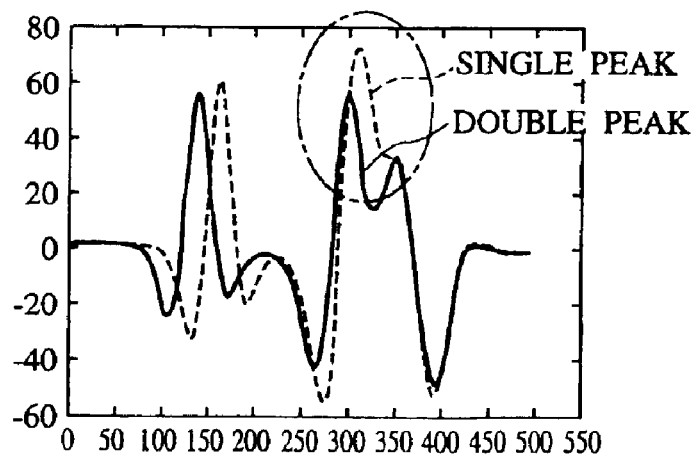

A classification method for classifying a hollowed shape will be described with reference to FIGS. 11A through 11D. FIG. 11A illustrates a cross-sectional shape, the sides of which are vertical; and FIG. 11B illustrates a shape, the sides of which are hollowed. FIG. 11C illustrates profiles of the secondary electron intensity of both shapes. FIG. 11D illustrates quadratic differential profiles shown in FIG. 11C. In FIG. 11D, the shape shown in FIG. 11A has double peaks in an area surrounded by a dotted ellipse, whereas the shape shown in FIG. 11B has a single peak. By detecting this difference, it is possible to classify into the vertical side and the hollowed side. Using a discrimination ratio to evaluate the double peaks makes it possible to determine a shape index value of a hollowed shape.

Next, how to classify a mixed shape using the whole signal profile will be described with reference to FIGS. 12A through 12C. FIG. 12A illustrates a cross-sectional shape of a wafer. FIG. 12B illustrates a corresponding profile of the intensity of a secondary electron. FIG. 12C concurrently illustrates profiles of the secondary electron intensity obtained from a plurality of wafers. In FIG. 12C, corrections are made so that dynamic ranges each representing the width between the maximum value and the minimum value of the secondary electron intensity, profile lengths, and peak positions, are aligned. After the preparations, feature index of a shape is calculated by the principal component analysis of the profile of the secondary electron intensity (for example, see "Computer Image Processing, Hideyuki TAMURA", pp. 270–273, Ohm-Sha Ltd., 2002).

FIG. 12D illustrates eigenvectors obtained by the above-mentioned processing. These vectors are expressed as the difference from a mean vector. The linear sum of the mean vector and these eigenvectors can approximate an original profile of the secondary electron intensity. These eigenvectors include information about a cross-sectional shape of the wafer. A shape index value is determined as follows. A mean profile is subtracted from an inputted profile of the secondary electron intensity, and then an inner product with a characteristic vector is calculated. This inner product value can be used as a shape index value. Here, the shape index value includes two or more kinds of shape information. Therefore, by creating a lookup table in which a cross-sectional image, along which the wafer is sectioned, is associated with a shape index value by use of the subjective estimation or a learning method (for example, the k-NN method, the perceptron, the SVM, and the Ada-boost), it is possible to judge the cross-sectional shape from the shape index value.

Figure 13A:
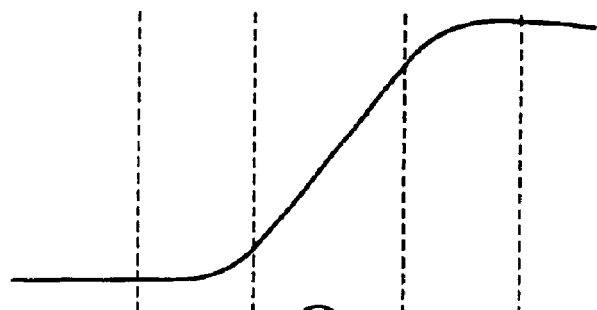
FIGS. 13A through 13D are diagrams illustrating divisions used when partially correcting a cross-sectional shape.
Figure 13B:
Figure 13C:
Figure 13D:
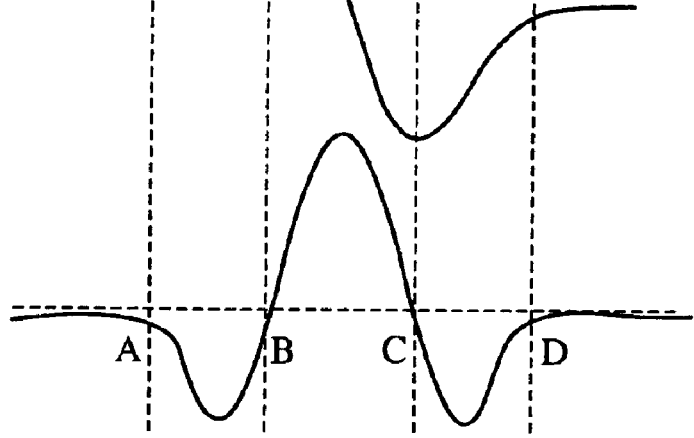
Figure 14A:
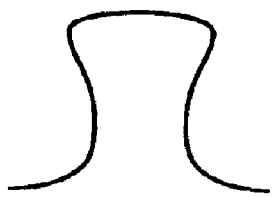
FIGS. 14A and 14B are diagrams illustrating effects of correcting a cross-sectional shape.
Figure 14B:
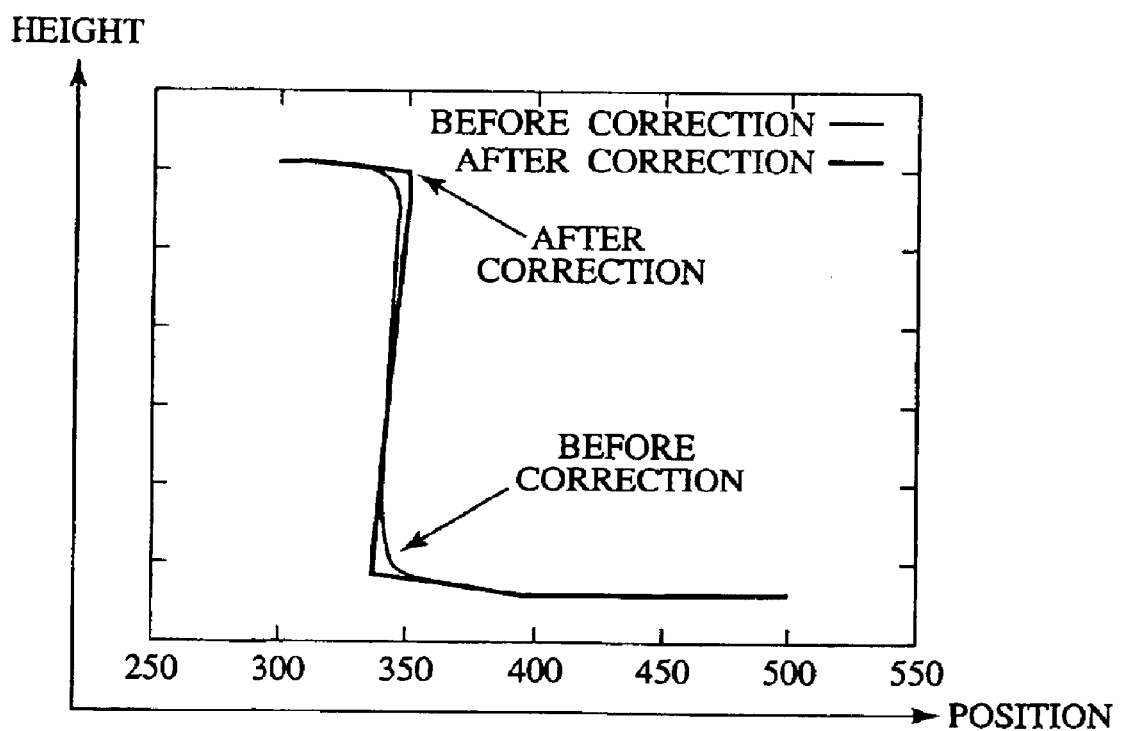

As an example of a shape correction method, a method for divisionally correcting a shape will be described with reference to FIGS. 13A through 13D and FIGS. 14A and 14B. FIG. 13A illustrates a cross-sectional shape of the side of a wafer. FIG. 13B illustrates a profile of the secondary electron intensity. FIG. 13C illustrates a linear differential profile of the profile shown in FIG. 13B. FIG. 13D illustrates a quadratic differential profile of the profile shown in FIG. 13B. In this embodiment, by use of zero crossing points B, C and 0 asymptotic points A, D shown in FIG. 13D, an area is divided into three parts: a footing part, a tilting part, and a rounding part. Then, the measurements of the cross-sectional shape obtained by the reshaping unit 702 is corrected by changing the parameters (the step 204 in FIG. 2) in each area on the basis of the shape index value obtained in FIGS. 7 through 12. FIGS. 14A and 14B illustrate an example of the result of the shape correction. FIG. 14A is a schematic diagram illustrating a hollowed cross-sectional shape, the sides of which are hollowed. FIG. 14B illustrates a cross-sectional shape determined by the reshaping unit 702, and the result of correcting the cross-sectional shape. It is to be noted that when the shape is to be corrected, a cross-sectional shape obtained by the stereo matching method, the photometric stereo method, the atom force microscope, the library matching method, or the spectra CD may also be corrected.

Figure 15:
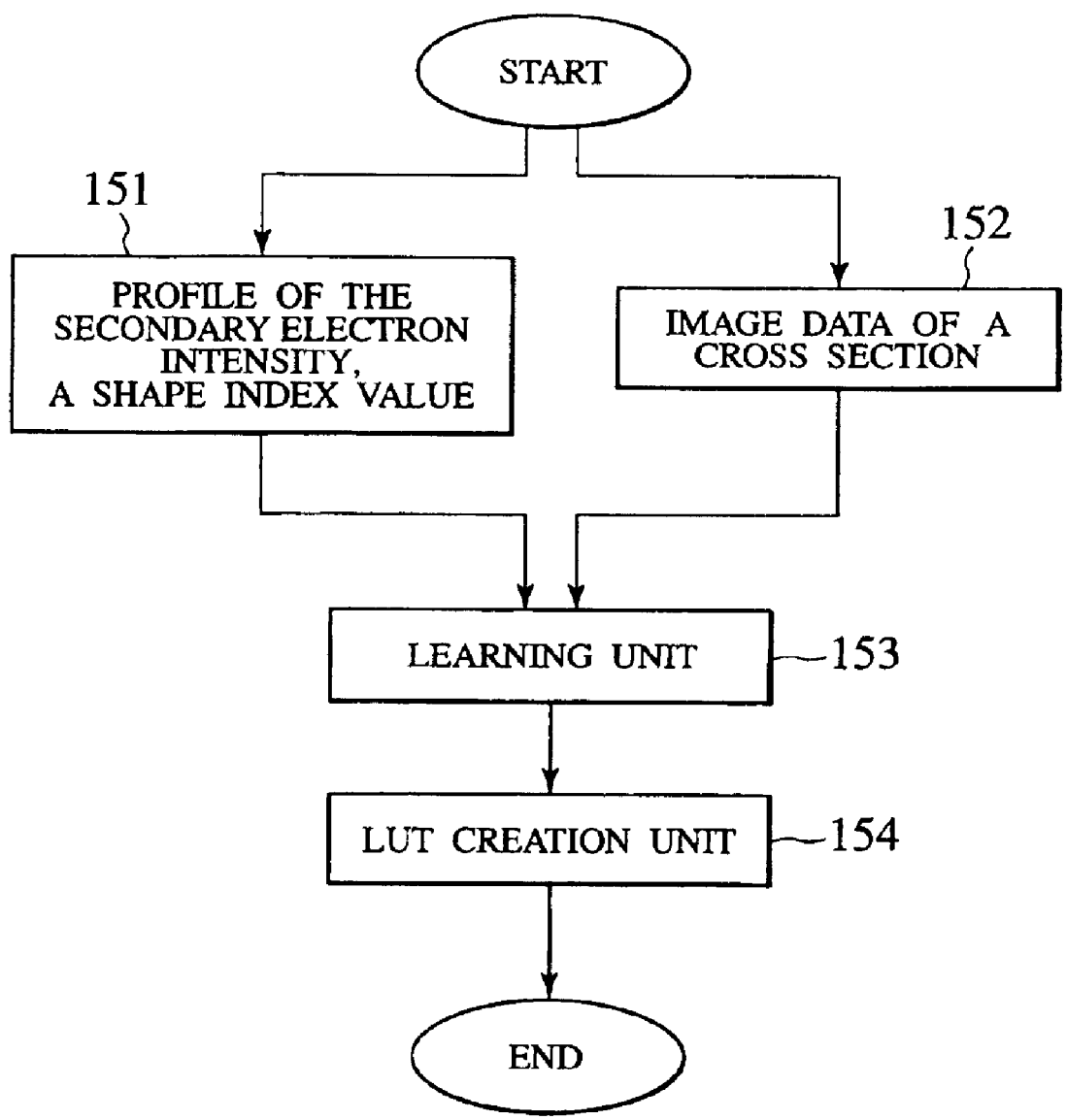
FIG. 15 is a schematic diagram illustrating a lookup-table creation method.

In this embodiment, other than the shape correction by use of a shape index value, it is also possible to directly output a corresponding cross-sectional shape from the shape index value by referring to a lookup table. A creation method for creating the lookup table and a shape classification method will be described with reference to FIG. 15. FIG. 15 is a schematic diagram illustrating the creation method for creating the lookup table that is used in the shape classification unit 705 shown in FIG. 7. A profile of the secondary electron intensity, or a shape index value determined by the profile of the secondary electron intensity (step 151), is inputted into a learning unit (step 153) together with a cross-sectional shape obtained by sectioning a wafer (step 152). In the learning unit, either the profile of the secondary electron intensity or the shape index value is associated with the cross-sectional shape. By use of the subjective estimation or the learning method (for example, the k-NN method, the perceptron, the SVM, the Ada-boost), the shape index value is associated with the cross-sectional image obtained by sectioning the wafer. On the basis of the result of the association, the lookup table is created (step 154). When the signal intensity or the shape index value, which has been obtained from the wafer, is inputted into the lookup table, a cross-sectional shape corresponding to the wafer is output on the basis of the result of the association.

According to the above-mentioned embodiment of the present invention, it is possible to cope with a shape that cannot be processed only by edge information of the prior art. For example, it is possible to cope with even the difference between top rounding and corner rounding, the difference between taper and retrograde, or a shape, the sides of which are hollowed.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A shape measuring apparatus comprises a charged particle beam apparatus comprising: a charged particle gun for emitting a charged particle beam, a scanning deflector for deflecting the charged particle beam on a sample, a detector for detecting charged particles emitted from an area scanned by the charged particle beam on the sample, and an image processor for measuring detected charged particles signal, wherein the image processor performs steps comprising:

irradiating the charged particle beam to the sample at a first angle, and measuring charged particles to generate a first signal, irradiating the charged particle beam to the sample at a second angle, and measuring charged particles to generate a second signal, varying a parameter indicating a relation between the first signal and a height of the sample or an inclination angle of the sample until the first signal achieves the second signal, and measuring the height of the sample or the inclination angle of the sample from detected charged particles based on the selected parameter.

2. The shape measuring apparatus according to claim 1 further comprising an input device for inputting information regarding to height of the sample to the image processor, wherein the image processor calculates the inclination angle using the inputted height information and the selected parameter.

3. The shape measuring apparatus according to claim 1 wherein, the image processor measures a shape of a cross-section based on charged particles emitted from the sample when the charged particle beam is scanned to a perpendicular direction against a direction of line scan.

4. The shape measuring apparatus according to claim 1 wherein, the image processor selects the parameter such that the difference of the first detected charged particles quantity and the second detected charged particles quantity is most near to the difference of detected charged particle quantity depending on the two angles difference.

5. A method for measuring a shape of a sample comprising steps of:

irradiating the charged particle beam to the sample at a first angle, and measuring charged particles to generate a first signal, irradiating the charged particle beam to the sample at a second angle, and measuring charged particles to generate a second signal, varying a parameter indicating a relation between the first signal and a height of the sample or an inclination angle of the sample until the first signal achieves the second signal, and measuring the height of the sample or the inclination angle of the sample from detected charged particles based on the selected parameter.

6. A program product for measuring a shape of a sample by a shape measuring apparatus comprising a charged particle beam apparatus comprising: a charged particle gun for emitting a charged particle beam, a scanning deflector for deflecting the charged particle beam on a sample, a detector for detecting charged particles emitted from an area scanned by the charged particle beam on the sample, the product comprising: executable code embodied in a readable medium, execution code causing the apparatus to perform a sequence of steps comprising:

irradiating the charged particle beam to the sample at a first angle, and measuring charged particles to generate a first signal, irradiating the charged particle beam to the sample at a second angle, and measuring charged particles to generate a second signal, varying a parameter indicating a relation between the first signal and a height of the sample or an inclination angle of the sample until the first signal achieves the second signal, and measuring the height of the sample or the inclination angle of the sample from detected charged particles based on the selected parameter.

* * * * *